April 29, 1969 J. H. BORNZIN 3,440,890
SAFETY POWER TAKE-OFF FOR TRACTORS
Filed June 7, 1967
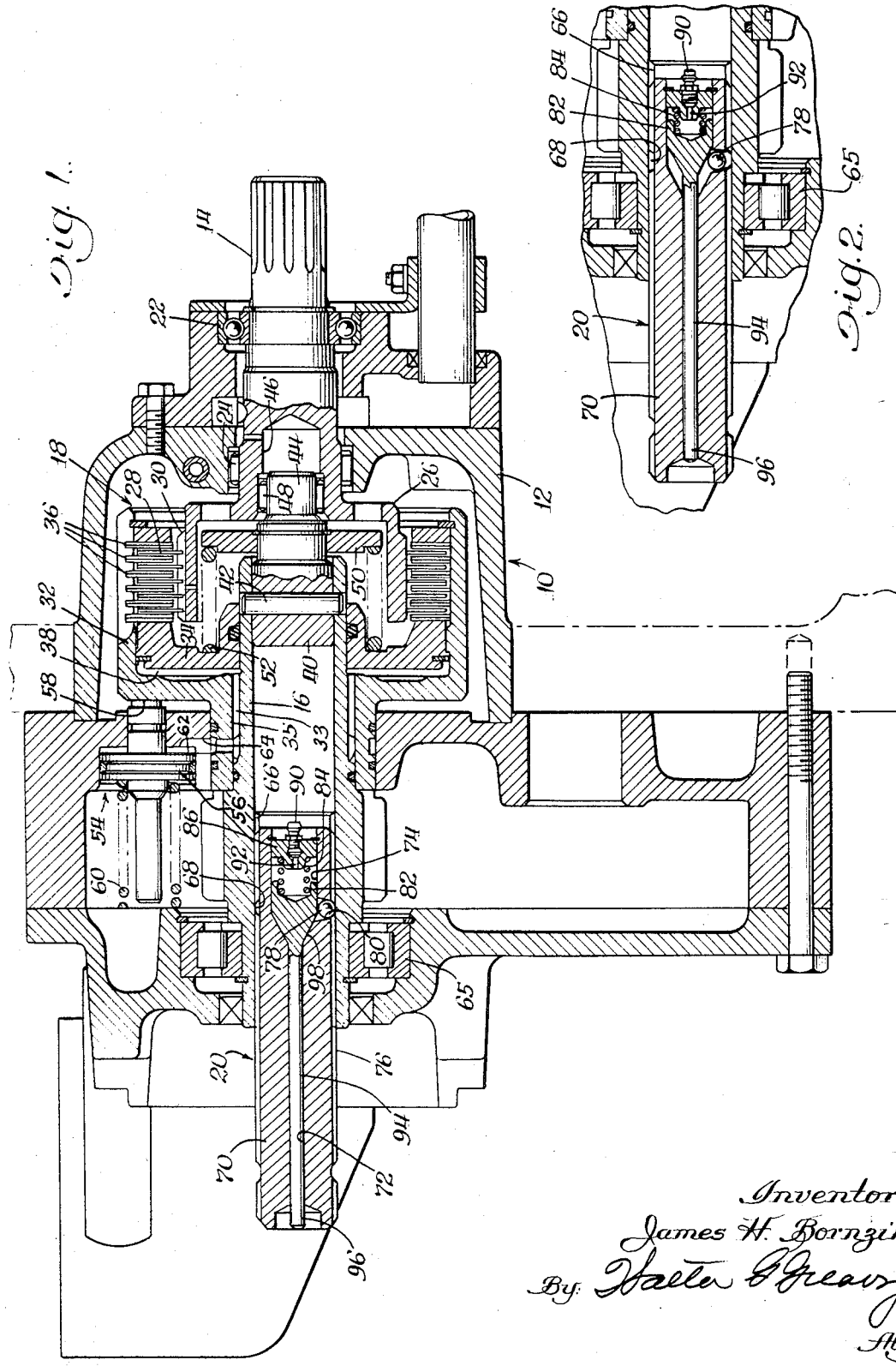
Inventor:
James H. Bornzin
By Walter G Greavy
Atty.

3,440,890
SAFETY POWER TAKE-OFF FOR TRACTORS
James H. Bornzin, La Grange, Ill., assignor to International Harvester, Company, Chicago, Ill., a corporation of Delaware
Filed June 7, 1967, Ser. No. 644,264
Int. Cl. F16h 37/02
U.S. Cl. 74—11                    10 Claims

ABSTRACT OF THE DISCLOSURE

A safety power take-off mechanism for use with tractors or other vehicles from which other units may be driven. This mechanism includes a power take-off stub shaft which is removable from the main mechanism when not in use so that it will not present a dangerous rotating projection. The stub shaft is inserted into a driven tubular shaft and includes means for releasably holding the stub shaft in engagement with the tubular driven shaft.

---

This invention relates to power take-off mechanisms are more particularly to a power take-off shaft safety arrangement for use on agricultural tractor units.

Normally, power take-off shafts incorporated on a tractor unit are splined shafts adapted to be drivingly coupled to another implement. The shaft usually is exposed and some means should be provided to prevent accidental contact therewith. Under certain conditions the projecting power take-off shaft is rotated even when no other implement is connected thereto to be driven, thus presenting even a more dangerous situation. In the past, shield members of various constructions have been provided to cover the projecting shaft as a protective device.

One of the important features of this invention is that the projecting power take-off shaft may be removed from the mechanism when not in use thus eliminating completely a dangerous projecting element.

Another object of the invention is to provide a removable power take-off stub shaft which may be locked in place against axial movement and means for releasing the stub shaft from its locked position.

The above and other objects and features of the invention will be more readily apparent when consideration in connection with the accompanying drawings in which:

FIGURE 1 is an elevation view in section showing a power take-off mechanism embodying the features of the invention;

FIGURE 2 is sectional view of the power take-off stub shaft showing the locking mechanism in a released position.

Referring now to the drawings, 10 designates generally a power take-off mechanism. It comprises a housing 12 which may either form a part of the rear end of a tractor or as a separate unit may be attached by suitable means to the rear end of the tractor. It includes a drive shaft 14 which may be operatively connected to and driven through suitable gearing (not shown) from the tractor transmission (not shown). The mechanism 10 also comprises a tubular driven shaft 16, a clutch mechanism 18 for transmitting drive from the drive shaft 14 to the driven shaft 16, and a power take-off stub shaft assembly 20 which forms an extension of driven shaft 16 and is inserted into the latter.

The drive shaft 14 extends into the housing 10 being mounted therein for rotation by suitable bearings 22 and 24. The clutch mechanism 18 comprises a clutch block in the form of a cup shaped member 26 formed on the inner end of drive shaft 14. The clutch block 26 carries a plurality of driving clutch plates 28 on the periphery thereof mounted for sliding movement on splines 30. The clutch mechanism 18 also includes a cup-shaped driven member 32 and a clutch actuator 34. The driven member 32 is splined to the tubular driven shaft 16 by spline connection 33 formed on extended annular portion 35. The member 32 carries a plurality of clutch plates 36 internally splined thereon for sliding movement in a conventional manner. The clutch actuator 34 is an annular member slidably mounted on the tubular shaft 16 and is adapted under the influence of fluid pressure on its annular face 38 to be moved to the right as viewed in FIGURE 1 to compress the driving and driven clutch plates 28 and 36 together to engage the clutch mechanism 18 and thereby drive the tubular shaft 16 from the drive shaft 14.

A stub shaft 40 inserted into tubular shaft 16 may be connected thereto by a pin member 42. The shaft 40 has a pilot portion 44 which is journalled in axially extending bore 46 formed in clutch block 26 by means of suitable bearing members such as needle bearings 48. An annular flange member 50 is mounted on an intermediate portion of shaft 40 and serves as a reaction member for compression spring 52 which surrounds tubular driven shaft 16. Under normal conditions when the power take-off mechanism is inoperative, the spring 52 urges the clutch actuator 34 to the left to hold the driving and driven clutch plates out of driving engagement.

In order to prevent rotation of the clutch driven member 32 when the clutch 18 is not engaged which might result from slight friction drag between the driving and driven clutch plates, a spring-biased friction brake 54 is provided.

This brake 54 comprises a spring biased piston member 56 normally urged against the face 58 of driven member 32 by compression spring 60. Fluid pressure from a source (not shown) acts on the face 62 of piston member 56 through passage 64 to urge the piston member 56 out of engagement with member 32 when the clutch 18 is to be engaged and the tubular shaft 16 is to be driven. Thus when the power take-off mechanism is inoperative, spring 52 holds the clutch 18 in a disengaged position and spring 60 urges piston 56 against member 32 to keep the latter from rotating. Then when the power take-off mechanism is to be used, fluid pressure from a source (not shown) acts against the face 62 of piston 56 to release the friction brake 54 and the face 38 of driven member 32 to engage clutch 18.

It will be observed that one end of the tubular driven shaft 16 is coaxially disposed in relation to drive shaft 14 and is in effect journalled in the clutch block 26 by means of the shaft 40. The shaft 16 is further effectively journalled in the housing 12 through the extended annular portion 35 of the driven member 32 to which it is connected by the spline connection 33 and through bearing member 65. The shaft 16 has splines 66 formed on the internal surface thereof. An internal annular groove or recess 68 is formed in the shaft 16 to receive detent locking means as hereinafter more fully explained.

The power take-off stub shaft assembly 20 comprises a shaft 70 having an axially extending bore 72 running almost the entire length thereof and an enlarged bore 74 formed at the inner end thereof, i.e., the end which is inserted into shaft 16. Complementary splines 76 are formed on the outer surface of stub shaft 20 to cooperate with the internal splines 66 on the tubular driven shaft 16 to secure the stub shaft 20 against rotation with respect to tubular shaft 16. The splines 76 may extend the full length of stub shaft 70, the spline portions on the outer end or projecting end thereof being used to connect to an auxiliary driven implement.

While the number of splines on the projecting end of the stub shaft 70 are dictated by industry standards, the number of splines used on the inner portion of the shaft 70 connecting to tubular shaft 16 could be varied as desired.

The stub shaft assembly 20 also comprises detent means, here shown in the form of a plurality balls 78, positioned in transverse bores 80 and adapted to cooperate with the internal groove or recess 68 formed to cooperate shaft 16 to lock the shaft 70 against axial movement. The balls 78 are held outwardly in a locking or engaging position by plug member 82 slidable in bore 74 and urged into a locking position as shown in FIGURE 1 by a compression spring 84. A reaction member 86 for spring 84 is positioned in the outer end of bore 74 being held in place therein by suitable means such as a snap ring 88. A lubrication fitting 90 may fitted into reaction member 86 so that lubrication may be injected through passage 92 in member 86 to the parts in and communicating with bore 74.

An actuating rod or plunger 94 is disposed in bore 72 and may form an integral extension of plug member 82 or be separate therefrom and bear against the member 82. It will be apparent from the drawings that the plunger 94 may be actuated from its outer end 96 to urge the plug member 82 to the right against the pressure of spring 84 to a position as shown in FIGURE 2, thus releasing the locking means. This presents a clearance into which the balls 78 are free to move in part as the stub shaft assembly is withdrawn from the tubular shaft 16. Releasing the plunger 94 permits a camming surface 98 formed on plug member 82 to again urge the balls 78 outwardly to a locking position.

Thus it will be apparent that I have advantageously provided a safety power take-off stub shaft assembly which can conveniently be withdrawn from the tubular shaft 16 when the power take-off mechanism is not in use. This eliminates the dangers of a projecting member which are common to present types of power take-off units. Another advantage of this removable type of stub shaft assembly is that shafts, having different numbers of splines, may be interchanged. Thus, a tractor owner can have one stub shaft assembly with the proper number of splines on the outer end thereof to accommodate modern auxiliary equipment and another to accommodate older equipment or different equipment that may have other than the present standardized number of connecting splines.

While a preferred embodiment of the invention has been specifically disclosed, it is to be understood that the invention is not limited thereto as other variations will be readily apparent to those skilled in the art and the invention is to be given its fullest possible interpretation within the terms of the following claims.

I claim:
1. A power take-off assembly for tractors comprising:
   a tubular driven shaft journalled for rotation in a housing portion associated with the tractor and adapted to be rotatably driven from a power source, said driven shaft having a free end positioned substantially flush with the exterior surface of said housing portion; a power take-off stub shaft having one end thereof inserted into said driven shaft and the other end thereof being adapted to be connected to an implement to be driven;
   means for securing said tubular driven shaft and said stub shaft against rotation with respect to each other;
   means for locking said stub shaft in said tubular driven shaft against axial movement with respect to the latter; and means for releasing said locking means.
2. The power take-off assembly of claim 1 wherein: lubrication means for said stub shaft is carried by the end of said stub shaft to be inserted into said tubular driven shaft.
3. The combination of claim 1 wherein:
   said locking means includes detent means carried by said stub shaft and adapted to engage said tubular driven shaft and means for holding said detent means in a locking position; and
   said releasing means includes cam means on said holding means.
4. The power take-off assembly of claim 1 including:
   longitudinally extending bore means in said stub shaft defining an outer wall having transverse bore means extending therethrough;
   said locking means comprising detent means disposed in said transverse bore means for coacting with recess means in said tubular driven shaft to lock said stub shaft against axial movement with respect to said tubular driven shaft; and
   means in said longitudinally extending bore means for holding said detent means in a locking position.
5. The combination of claim 4 wherein:
   said holding means is spring-biased.
6. The combination of claim 4 wherein:
   said holding means is a spring-biased cammed member; and
   said releasing means includes a plunger member slidable in said longitudinally extending bore means and operable from said other end of said stub shaft to urge said holding means against the force of said spring-biasing means and thereby release said detent means from engagement with said tubular driven shaft.
7. The power take-off assembly of claim 1 wherein:
   said means for securing said tubular driven shaft and said stub shaft against rotation with respect to each other comprise cooperating spline means;
   said locking means includes detent means and spring biased means for holding said detent means in locking engagement with said tubular driven shaft; and
   said releasing means includes means actuatable from said other end of said stub shaft to permit said detent means to be moved out of engagement with said tubular driven shaft.
8. The combination of claim 7 wherein:
   said releasing means comprises a plunger member extending through one end of said stub shaft in operative association with said spring biased means.
9. A power take-off shaft adapted to be inserted into a power take-off tubular driven shaft comprising:
   means for securing said stub in said tubular driven shaft against rotation with respect to the latter;
   locking means carried by said stub shaft and movable outwardly into engagement with said driven shaft for locking said stub shaft in said tubular driven shaft against axial movement with respect to the latter; and
   means for releasing said locking means.
10. The power take-off stub shaft of claim 9 wherein:
   said securing means comprises a plurality of splines extending the length of said shaft;
   said locking means comprises detent means disposed in the outer periphery of said shaft and adapted to cooperate with recess means in a tubular driven shaft of a power take-off assembly, and spring biased means for urging said detent means to a locking position; and
   said releasing means comprises a plunger member slidably disposed in said shaft, engageable with said spring biased means and operable to urge said spring biased means to a non-locking position.

References Cited
UNITED STATES PATENTS 3,252,721 5/1966 Weasler.
3,260,541 7/1966 Sadler et al. _____ 74—11 X DONLEY J. STOCKING, *Primary Examiner.*

LEONARD H. GERIN, *Assistant Examiner.*

U.S. Cl. X.R.

74—527; 287—119